US012604808B2

(12) United States Patent
Carlson et al.

(10) Patent No.: US 12,604,808 B2
(45) Date of Patent: Apr. 21, 2026

(54) COTTON SPINDLE VARIABLE BARB GEOMETRY

(71) Applicant: Deere & Company, Moline, IL (US)

(72) Inventors: Brandon C Carlson, Ankeny, IA (US); Kurt D. Gustafson, Altoona, IA (US); Darrin S. Meyer, Pella, IA (US); Matthew A. Asplund, Marshalltown, IA (US)

(73) Assignee: Deere & Company, Moline, IL (US)

( * ) Notice: Subject to any disclaimer, the term of this patent is extended or adjusted under 35 U.S.C. 154(b) by 412 days.

(21) Appl. No.: 18/252,381

(22) PCT Filed: Jan. 19, 2022

(86) PCT No.: PCT/US2022/012892
§ 371 (c)(1),
(2) Date: May 10, 2023

(87) PCT Pub. No.: WO2022/173563
PCT Pub. Date: Aug. 18, 2022

(65) Prior Publication Data
US 2024/0008408 A1 Jan. 11, 2024

Related U.S. Application Data

(60) Provisional application No. 63/147,255, filed on Feb. 9, 2021.

(51) Int. Cl.
*A01D 41/16* (2006.01)
*A01D 46/16* (2006.01)
(52) U.S. Cl.
CPC ................................... *A01D 46/16* (2013.01)

(58) Field of Classification Search
CPC .......................................... A01D 46/00–46/30
See application file for complete search history.

(56) References Cited

U.S. PATENT DOCUMENTS

| 1,443,058 A | * | 1/1923 | Taylor | B23D 43/02 |
| | | | | 407/15 |
| 2,504,723 A | | 4/1950 | Paradise | |

(Continued)

FOREIGN PATENT DOCUMENTS

| CN | 1826854 A | 9/2006 |
| CN | 102720825 A | 10/2012 |

(Continued)

OTHER PUBLICATIONS

The International Search Report and The Written Opinion of the International Searching Authority, or The Declaration of the related PCT Application No. PCT/US2022/012892, Date Mailed Apr. 4, 2022, 10 pages.

(Continued)

*Primary Examiner* — Joseph M Rocca
*Assistant Examiner* — Madeline I Runco
(74) *Attorney, Agent, or Firm* — Tucker Ellis LLP; Patrick F. Clunk

(57) ABSTRACT

In order to optimize strength, wear, and picking efficiency, a cotton picker spindle may comprise a first end oppositely disposed from a second end. The spindle may comprise a plurality of barbs disposed about a surface of the body. Each of the barbs may comprise barb attributes comprising barb width, leading angle, trailing angle and barb depth. One or more of the barb attributes may change from the first end towards the second end. Barb spacing may also be varied.

20 Claims, 2 Drawing Sheets

(56) References Cited

U.S. PATENT DOCUMENTS

| | | | |
|---|---|---|---|
| 2,546,185 A | 3/1951 | Hagen | |
| 2,787,109 A * | 4/1957 | Lindsay | A01D 46/14 |
| | | | 56/50 |
| 2,823,509 A | 2/1958 | Lindsay | |
| 3,137,115 A * | 6/1964 | Kath, Jr. | A01D 46/08 |
| | | | 56/50 |
| 4,483,132 A | 11/1984 | Crites | |
| 5,404,698 A | 4/1995 | Copley | |
| 2013/0104510 A1 | 5/2013 | Augustine | |

FOREIGN PATENT DOCUMENTS

| | | | |
|---|---|---|---|
| CN | 103081645 A | 5/2013 | |
| CN | 106068926 A | 11/2016 | |
| GB | 668426 A | 3/1952 | |
| SU | 1007591 A1 | 3/1983 | |

OTHER PUBLICATIONS

"Two-sided Drum For Maximum Picking Efficiency," Extenda-Wear Spindles, webpage <https://www.caseih.com/northamerica/en-us/products/harvesting/module-express-cotton-pickers>, 1 page, Retrieved from Internet Archive WayBack Machine <URL:https://web.archive.org/web/20210127012442/https://www.caseih.com/northamerica/en-us/products/harvesting/module-express-cotton-pickers> on Apr. 25, 2022.

"400 HP Module Express Cotton Pickers," webpage <https://www.caseih.com/northamerica/en-us/products/harvesting/module-express-cotton-pickers>, 14 page, Retrieved from Internet Archive WayBack Machine <URL:https://web.archive.org/web/20210127012442/https://www.caseih.com/northamerica/en-us/products/harvesting/module-express-cotton-pickers> on Apr. 25, 2022.

* cited by examiner

COTTON SPINDLE VARIABLE BARB GEOMETRY

This application is a national phase application of International Application No. PCT/US2022/012892, filed Jan. 19, 2022, which claims priority to provisional application 63/147,255 filed on Feb. 9, 2021, all of which are incorporated herein by reference.

BACKGROUND

Some agricultural vehicles have wearable components. One such example of an agricultural vehicle is a cotton picker. The cotton picker harvests cotton from a cotton plant in a field and reduces harvest time and maximizes efficiency. Cotton pickers may comprise a plurality of row units, each unit having an upright picker drum with a plurality of spindle bars. The spindle bars are configured to rotatably mount tapered spindles with barbs for picking cotton from the plants. The cotton-wrapped spindles pass under rotating doffer disks, which unwind the cotton and push the cotton off the ends of the spindles.

In some spindles, barb to barb cross section is controlled by the cutting tool and remains constant from the first barb (at the tip) to the last barb (closest to the spindle nut). For barbs having a uniform barb profile, precision during manufacturing and measurement may not be a priority. Spindle configurations often require considerable doffing force to unwind the cotton tightly wrapped about the spindle between the barbs and to move the cotton axially off the spindle. As such, the barb width toward the tip where the diameter of the tapered spindle are smallest tend to wear first. This is due to a combination of 1) increased loads from higher radial speeds further from the drum axis and 2) reduced sectional properties as a result of the spindle taper.

As barbs wear, wear may be uneven as barbs in proximity to the tip encounter higher forces as the cotton is removed from the spindles. There is a need in the art for a cotton picker spindle configuration to optimize wear of the barbs on the spindle while optimizing barb strength, wear, and picking efficiency.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation, a cotton picker spindle may comprise a first end oppositely disposed from a second end. The spindle may comprise a plurality of barbs disposed about a surface of the body. Each of the barbs may comprise barb attributes comprising barb width, barb spacing, leading angle, trailing angle, and barb depth. The barb width may decrease from the first end towards the second end. One or more barb attributes may by varied from the first end towards the second end.

In one implementation a cotton picker spindle may comprise a body rotatable about an axis in a preselected direction of rotation. The spindle may comprise a first end oppositely disposed from a second end. The first end may comprise a tapered end. The spindle may comprise a plurality of barbs disposed about a surface of the body. Each of the barbs may comprise a longitudinal axis, a top surface, a leading wall, a trailing wall, and a trailing angle. The top surface may comprise a barb width measured between a barb leading edge and barb trailing edge. The trailing angle may be defined between the longitudinal axis and the trailing wall. The trailing wall may be defined between the trailing edge and a landing width. The landing width may extend between adjacent barbs. The barb width of each of the plurality of barbs may decrease from the first end towards the second end. The trailing angle may increase from the first end towards the second end.

In another implementation, the cotton spindle may further comprise a midsection interposed between the first end and the second end, wherein the trailing angle increases from barbs proximate the first end to barbs proximate the midsection.

Further, in another implementation, the trailing angle may increase no more than about three degrees between adjacent barbs.

In another implementation, the trailing angle may increase no more than about 2.5 degrees between adjacent barbs.

Further, in yet another implementation, the trailing angle may be between about 30 degrees proximate the first end to about 45 degrees proximate the second end.

In another implementation, the cotton spindle may further comprise a midsection interposed between the first end and the second end, wherein the barb width may decrease from the barb proximate the first end to another barb disposed proximate the midsection.

In yet another implementation, the barb width may decrease no more than about 0.025 mm relative to an adjacent barb.

In another implementation, the barb width may range from about 1.125 mm proximate the first end to about 0.95 mm proximate a midsection of the spindle.

In another implementation, each of the plurality of barbs may further comprise a barb lead wall and a barb lead angle. The barb lead angle may be defined between the barb longitudinal axis and the barb lead wall. The barb lead angle may decrease from the first end towards the second end.

In yet another implementation, a midsection may be interposed between the first end and the second end. Each of the plurality of barbs may further comprise a barb lead wall and a barb lead angle. The barb lead angle may be defined between the barb longitudinal axis and the barb lead wall. The barb lead angle may decrease from the first end towards the midsection.

In another implementation, the barb lead angle may decrease no more than about 2.5 degrees from the first end toward the midsection.

In yet another implementation, the barb lead angle may range from about 105 degrees proximate the first end to about 92.5 degrees proximate the second end.

Further, in another implementation, barb spacing may be defined from the leading edge of one barb to the leading edge of the adjacent barb. The barb spacing may decrease from the first end towards the second end.

In another implementation, the barb spacing may range from about 3.4 mm proximate the first end to about 3 mm proximate the second end and proximate a midsection of the spindle.

In another implementation, each barb may comprise a barb depth where the barb depth may be measured between the barb width surface and the landing width. The barb depth may be about 1 mm from the first end and towards the second end.

In one implementation a cotton picker spindle may comprise a body rotatable about an axis in a preselected direction of rotation. The spindle may comprise a first end oppositely disposed from a second end. The first end may comprise a tapered end with a tip. The midsection may be interposed between the first end and the second end. The spindle may comprise a plurality of barbs disposed about a surface of the body. Each of the barbs may comprise a longitudinal axis, a top surface, a leading wall, a trailing wall, and a trailing angle. The top surface may comprise a barb width measured between a barb leading edge and barb trailing edge. The trailing angle may be defined between the longitudinal axis and the trailing wall. The trailing wall may be defined between the trailing edge and a landing width. The landing width extending between adjacent barbs. The barb width of each of the plurality of barbs may decrease from the first end towards the second end. The trailing angle may increase from the first end towards the second end. The barb width may be configured to increase strength such that barbs disposed proximate the first end may have greater strength than barbs disposed proximate the midsection. The barb trailing angle may be configured to increase strength such that barbs disposed proximate the first end may have greater strength than barbs disposed proximate the midsection.

In another implementation, each of the barbs of the plurality of barbs may further comprise a barb lead angle, and barb depth. The barb lead angle may be defined between the barb longitudinal axis and the barb lead wall. Barb spacing may be defined from the leading edge of one barb to the leading edge of the adjacent barb, and the barb depth measured between the barb width surface and the landing width. The barb lead angle may be configured to have greater picking efficiency for barbs disposed proximate the first end than barbs disposed proximate the second end. The barb spacing may be configured to optimize picking efficiency.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

Figure 1:
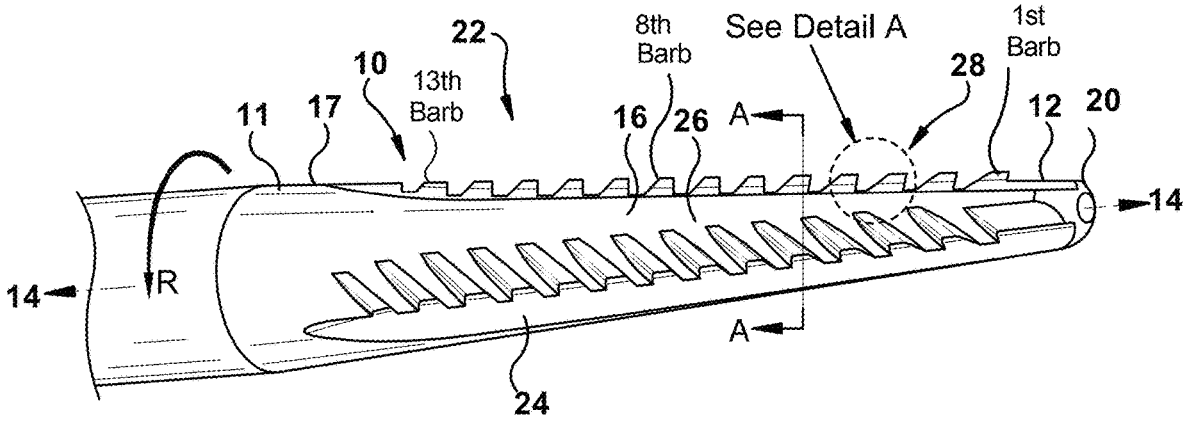
FIG. 1 is a perspective view of a cotton picker spindle.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

In one implementation, a cotton picker spindle may utilize a non-constant section to optimize spindle strength while minimizing the impact to picking effectiveness. An implementation varies the barb section to match the changing load while minimizing profile to minimize impact to picking effectiveness. This is achieved by varying one or more -barb attributes: 1) the barb width, 2) leading barb angle, 3) trailing barb angle, and 4) barb depth. Barb to barb spacing may also be varied. In one implementation, the barb may be made gradually thicker and the barb angle may be made progressively made flatter. Additionally, barb spacing may be varied to maintain performance. Barb depth may vary to clear an axial flute cut and may provide a sharp feel. Barb geometry may be tailored at each location along the spindle length for more even wear across the spindle from the tip and along the spindle length. A relationship exists regarding barb strength and its position on the spindle. Barb strength may be greatest at a tip of the spindle because it encounters the greatest amount of impact with an associated cotton plant.

The barb attributes were changed to achieve desired maximum stress levels based on the varied load inputs. The implementations described herein describing barb shape provides a longer lasting spindle with minimal impact to picking performance with minimal cost impact. In addition, the gradually flatter trailing barb angle provides a spindle that is easier to doff (or remove cotton once picked) in operation.

The implementations for the barb profiles described herein involve precise manufacturing processes and measurement techniques. Barb features on a spindle are very small. Barb width may be less than 1 mm and the trailing edge angle may range between about 30 to about 45 degrees. It takes very sophisticated measurement methods to ensure specifications are being met. Dimensional tolerance requirements are very small, for example, fractions of a millimeter, and so highly accurate machining equipment is utilized to achieve the minute barb to barb changes described herein with the barb design.

Figure 2:
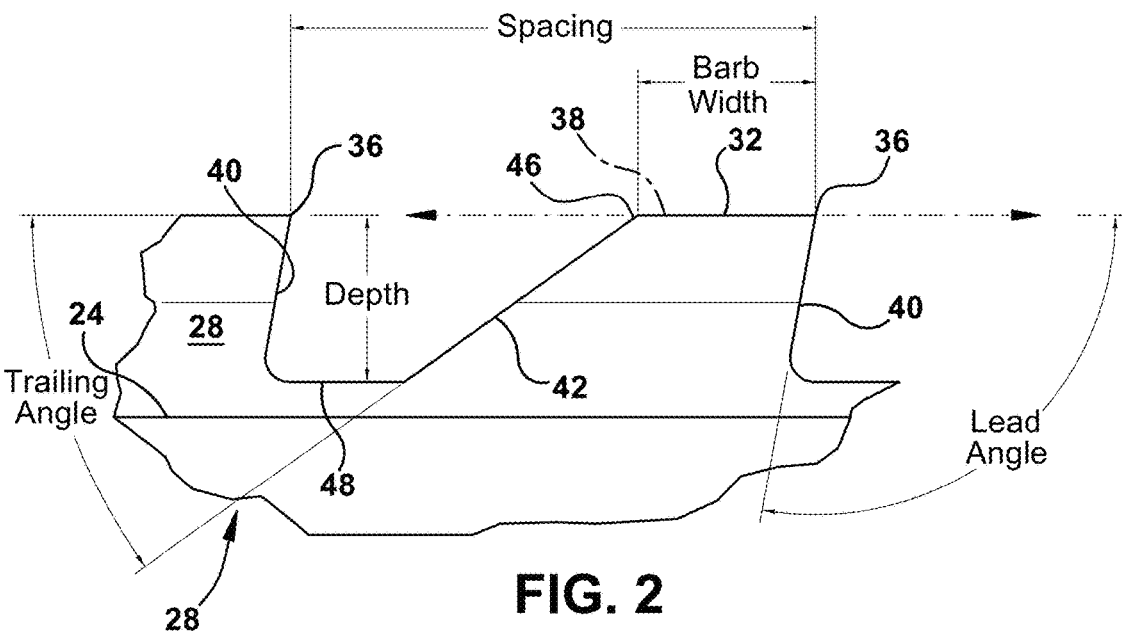
FIG. 2 is an enlarged view of detail A of FIG. 1.
Figure 3:
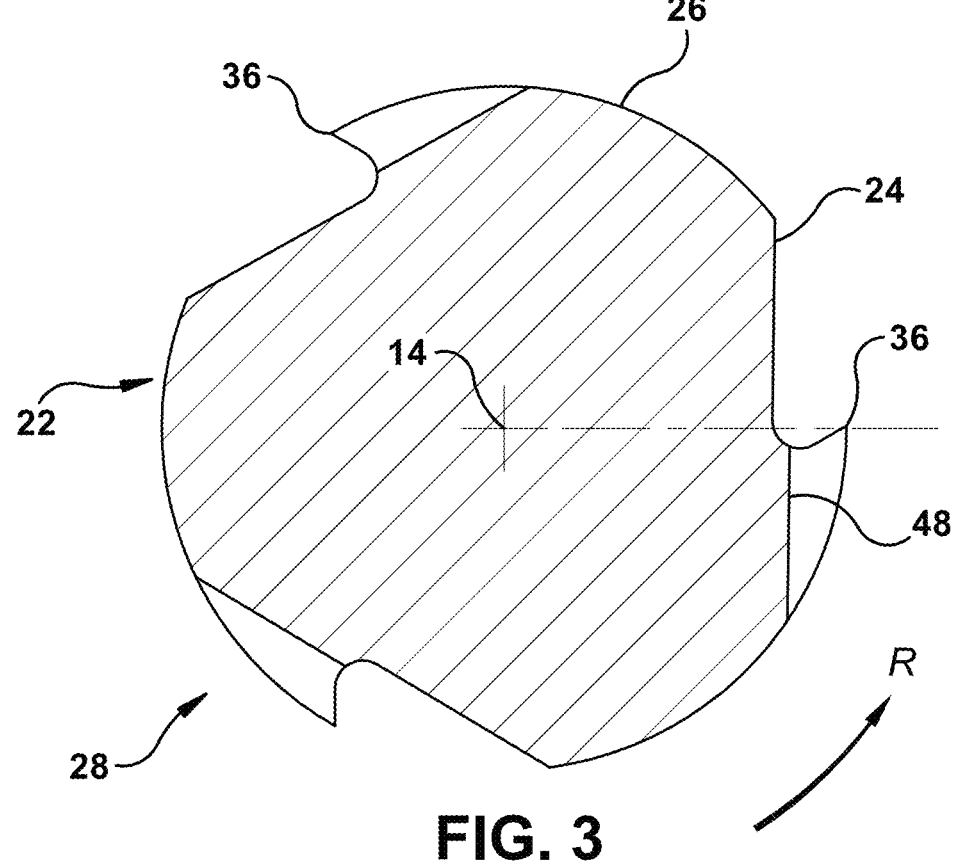
FIG. 3 is a cross sectional view taken along line A-A of FIG. 1.

Referring now to FIGS. 1-3, a spindle 10 which includes a cylindrically shaped bearing portion (not shown) concentric with longitudinal axis 14 and supported in a bushing in the spindle bar (not shown). A gear (not shown) located at the end of the bearing portion may engage a complimentary gear in the spindle bar to rotate the spindle in the direction R about the axis 14. The spindle 10 may comprise a body 11. The spindle 10 may comprise a first end 12, a midsection 16, and a second end 17. The second end 17 may be oppositely disposed from the first end 12. The midsection 16 may be interposed between the first end 12 and the second end 17. In one implementation, the spindle 10 may be a single piece. In another implementation, the spindle 10 may comprise two or more pieces. By way of nonlimiting example, a two piece spindle 10 may have the second 17 selectably engageable with the gear. By having the spindle 10 selectably engageable with the gear, the spindle 10 may be removed from the spindle bar for repair or replacement.

The spindle 10 may taper towards the first end 12, which may comprise a rounded tip portion 20 to define a cone-shaped picking end 22. The spindle 10 may comprise one or more sets of flutes 24. In one implementation, the spindle 10 may comprise three sets of alternating flutes 24 and rounded lands 26 substantially equally spaced about the surface periphery of the picking end 22. The flutes 24 may be disposed radially inwardly of the rounded lands 26. A plurality of teeth or barbs 28 project over the flutes 24. The barbs include upper surfaces or tops 32 which may lie along the surface of the cone described by the continuation of the lands 26.

As shown in the drawings, thirteen barbs 28 are spaced substantially equidistantly along the length of each flute 24. In other implementations, the plurality of barbs 28 may be ten barbs. In yet another implementation, the plurality of barbs may be eleven barbs, or twelve barbs. Any number of barbs 28 may be chosen with sound engineering judgment. Barbs 28 may be referenced starting at the first end 12 and moving towards the second end 17.

The spindle 10 may comprise a plurality of barbs 28 disposed about the surface 32 of the cone shaped body end 22. Each of the barbs 28 may comprise barb attributes comprising barb width, barb spacing, leading angle, and trailing angle. The barb cross section may be non-constant from the first end 12 to a predetermined distance towards the second end 17. The non-constant cross section configured by varying one or more barb attributes. Each of the barbs 28 may comprise the top surface 32 comprising a longitudinal axis 38, a leading wall 40, a trailing wall 42, and the trailing angle.

The top surface 32 may comprise the barb width measured between a barb leading edge 36 and barb trailing edge 46. Barb width may be utilized to enhance barb strength. Barb strength may be greatest at the tip 20. The wider the barb width, the greater the wear. However, the barb width should be balanced to optimize picking efficiency. The barb width of each of the plurality of barbs 28 may decrease from the first end 12 towards the second end 17. The barb width may decrease from the barb 28 proximate the first end 12 to another barb 28 disposed proximate the midsection 16. In yet another implementation, the barb width may decrease no more than about 0.025 mm relative to an adjacent barb from the first end 12 towards the second end 17. In one implementation, the barb width may range from about 1.5 mm proximate the first end 12 to about 0.9 mm proximate the midsection 16 of the spindle 10. In another implementation, the barb width may range from about 1.125 mm proximate the first end 12 to about 0.95 mm proximate a midsection 16 of the spindle 10.

The trailing angle may be defined between the longitudinal axis 38 and the trailing wall 42. The trailing wall 42 may be defined between the trailing edge 46 and a landing width 48. The trailing angle may be configured to add strength to the barb 28. In one implementation, flatter angles, such as those where the trailing angle is smaller towards the first end 12, may increase the barb strength. Flatter angles may also make cotton easier to remove from the spindle 10. The landing width 48 may extend between adjacent barbs 28. The trailing angle may increase from the first end 12 towards the second end 17. In another implementation, the trailing angle increases from barbs 28 proximate the first end 12 to barbs proximate the midsection 16. In yet another implementation, the trailing angle may increase no more than about 5 degrees between adjacent barbs 28 from the first end 12 towards the second end 17. Further, in another implementation, the trailing angle may increase no more than about 3 degrees between adjacent barbs 28 from the first end 12 towards the second end 17. In another implementation, the trailing angle may increase no more than about 2.5 degrees between adjacent barbs 28 from the first end 12 towards the second end 17. Further, in yet another implementation, the trailing angle may be between about 30 degrees proximate the first end 12 to about 45 degrees proximate the second end 17.

In another implementation, each of the plurality of barbs 28 may further comprise the barb lead wall 40 and the barb lead angle. The barb leading angle may be defined between the barb longitudinal axis 38 and the barb lead wall 40. By way of example, larger barb lead angles, such as those greater than 90 degrees, may increase aggressiveness of how the barb interacts with the crop. Larger values at the tip 20 intended to gain back some picking efficiency that is lost by having wider barbs 28 with flatter trailing angles. The barb lead angle may decrease from the first end 12 towards the second end 17. In another implementation, the barb lead angle may decrease from the first end 12 towards the midsection 16. In a nonlimiting implementation, the barb lead angle may decrease no more than about 2.5 degrees from the first end 12 toward the midsection 16. In one implementation, the barb leading angle may range from about 110 degrees proximate the first end 12 to about 90 degrees proximate the second end 17. In yet another implementation, the barb lead angle may range from about 105 degrees proximate the first end 12 to about 92.5 degrees proximate the second end 17.

The barb spacing may be defined from the leading edge 36 of one barb 28 to the leading edge 36 of the adjacent barb 28. The barb spacing may be varied due to barb width and the trailing angle in order to maintain a minimum landing width 48 at the bottom of the barb 28, which may help maintain picking efficiency. The barb spacing may decrease from the first end 12 towards the second end 17. In one example implementation, the barb spacing may range from about 3.4 mm proximate the first end 12 to about 3 mm proximate the second end 17 and proximate a midsection 16 of the spindle 10. In another implementation, the barb spacing may range from about 3.5 mm proximate the first end 12 to about 2.8 mm proximate the second end 17.

The barb depth may be measured between the barb surface 32 and the landing width 48. The barb depth may be about 1 mm from the first end 12 and towards the second end 17. In another implementation, the barb depth may be about 1.1 mm proximate the first end 12 to about 0.5 mm proximate the second end 17. The barb depth may be varied to clear the flute 24. In one implementation, the barb depth may be made shallower towards the second end 17 to clear curve runout on the flute 24.

This invention varies various spindle barb parameters along all the barbs to minimize barb stress levels. Barb width remains as small as possible to enhance wear and maximize picking efficiency. Barb trailing and leading angles are optimized to enhance wear and doffing ability. Barb depth is controlled to clear the flute surface. Barb spacing is optimized to maintain proper barb to barb relationship.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A cotton picker spindle, comprising:
a body rotatable about an axis in a preselected direction of rotation;
a first end, a midsection, and a second end, the first end being oppositely disposed from the second end, the first end comprising a tapered end with a tip, the midsection being interposed between the first end and the second end; and
a plurality of barbs disposed about a surface of the body, each of the barbs having a barb longitudinal axis, a top surface, a lead wall, and a trailing wall, the top surface having a barb width measured between a barb leading edge and a barb trailing edge; each of the barbs having a trailing angle, the trailing angle defined between the barb longitudinal axis and the trailing wall, the trailing wall defined between the barb trailing edge and a landing width, the landing width extending between adjacent barbs;

wherein the barb width of each of the barbs decreases from the first end towards the second end and the trailing angle increases from the first end towards the second end;
wherein the barb width is configured to increase strength such that barbs disposed proximate the first end have greater strength than barbs disposed proximate the midsection; and
wherein the trailing angle is configured to increase strength such that barbs disposed proximate the first end have greater strength than barbs disposed proximate the midsection.

2. The cotton picker spindle of claim 1, further comprising barb spacing defined from the barb leading edge of one barb to the barb leading edge of the adjacent barb, each of the barbs having a barb lead angle and barb depth, the barb lead angle defined between the barb longitudinal axis and the barb lead wall, and the barb depth measured between the top surface and the landing width;
wherein the barb lead angle is configured to have greater picking efficiency for barbs disposed proximate the first end than barbs disposed proximate the second end; and
wherein the barb spacing is configured to optimize picking efficiency.

3. The cotton picker spindle of claim 2, wherein the barb width ranges from about 1.125 mm proximate the first end to about 0.95 mm proximate the midsection;
wherein, the trailing angle is between about 30 degrees proximate the first end to about 45 degrees proximate the second end;
wherein the barb lead angle ranges from about 105 degrees proximate the first end to about 92.5 degrees proximate the second end; and
wherein the barb spacing ranges from about 3.4 mm proximate the first end to about 3 mm proximate the second end and proximate the midsection.

4. The cotton picker spindle of claim 2, wherein the barb depth is measured between the top surface and the landing width, the barb depth being about 1 mm from the first end towards the second end.

5. The cotton picker spindle of claim 1, wherein the trailing angle increases from the barbs proximate the first end to the barbs proximate the midsection.

6. The cotton picker spindle of claim 1, wherein the trailing angle increases from the first end towards the second end no more than about 2.5 degrees between adjacent barbs.

7. The cotton picker spindle of claim 1, wherein the trailing angle is between about 30 degrees proximate the first end to about 45 degrees proximate the second end.

8. The cotton picker spindle of claim 1, wherein the barb width decreases from a barb proximate the first end to another barb disposed proximate the midsection.

9. The cotton picker spindle of claim 8, wherein the barb width decreases no more than about 0.025 mm relative to adjacent barbs.

10. The cotton picker spindle of claim 8, wherein the barb width ranges from about 1.125 mm proximate the first end to about 0.95 mm proximate a midsection of the cotton picker spindle.

11. The cotton picker spindle of claim 1, wherein each of the barbs further comprises a lead angle defined between the barb lead wall and the barb longitudinal axis, wherein the barb lead angle decreases from the first end towards the second end.

12. The cotton picker spindle of claim 11, wherein the barb lead angle decreases no more than about 2.5 degrees from the first end toward the midsection.

13. The cotton picker spindle of claim 1, further comprising a barb lead angle defined between the barb longitudinal axis and the barb lead wall, the barb lead angle decreases from the first end towards the midsection.

14. The cotton picker spindle of claim 13, wherein the barb lead angle ranges from about 105 degrees proximate the first end to about 92.5 degrees proximate the second end.

15. The cotton picker spindle of claim 1, further comprising barb spacing, the barb spacing defined from the barb leading edge of one barb to the barb leading edge of the adjacent barb, wherein the barb spacing decreases from the first end towards the second end.

16. The cotton picker spindle of claim 15, wherein the barb spacing ranges from about 3.4 mm proximate the first end to about 3 mm proximate the second end and proximate a midsection of the cotton picker spindle, the midsection interposed between the first end and the second end.

17. A cotton picker spindle, comprising:
  a body rotatable about an axis in a preselected direction of rotation;
  a first end oppositely disposed from a second end and defining a body longitudinal axis therebetween, the first end having a tapered end; and
  a plurality of barbs disposed about a surface of the body having barb spacing, each of the barbs having a top surface, a lead wall, a trailing wall, a barb leading edge, a barb trailing edge, a landing width, and a barb longitudinal axis defined by the top surface extending from the barb leading edge to the barb trailing edge; and
  barb attributes including a barb width, a lead angle, a barb depth, and a trailing angle, one or more of the barb attributes being varied from the first end towards the second end, the barb width defined between the barb leading edge and the barb trailing edge, the barb width decreasing from the first end toward the second end, the trailing wall defined between the barb trailing edge and the landing width, the landing width extending between adjacent barbs, the trailing angle defined between the barb longitudinal axis and the trailing wall.

18. The cotton picker spindle of claim 17, wherein the barb width of each of the barbs decreases from the first end towards the second end and the trailing angle increases from the first end towards the second end;
  wherein the barb width is configured to increase strength such that barbs disposed proximate the first end have greater strength than barbs disposed proximate a midsection; and wherein the trailing angle is configured to increase strength such that barbs disposed proximate the first end have greater strength than barbs disposed proximate the midsection.

19. The cotton picker spindle of claim 18, wherein the barb spacing is defined from the barb leading edge of one barb to the barb leading edge of the adjacent barb, each of the barbs having a barb lead angle and barb depth, the barb lead angle defined between the barb longitudinal axis and the barb lead wall, and the barb depth measured between the top surface and the landing width;
  wherein the barb lead angle is configured to have greater picking efficiency for barbs disposed proximate the first end than barbs disposed proximate the second end; and
  wherein the barb spacing is configured to optimize picking efficiency.

20. A cotton picker spindle, comprising:
  a body rotatable about an axis in a preselected direction of rotation,
  a first end, a midsection, and a second end, the first end being oppositely disposed from the second end, the first end comprising a tapered end with a tip, the midsection being interposed between the first end and the second end;
  a plurality of barbs disposed about a surface of the body, each of the barbs having a barb longitudinal axis, a top surface, a lead wall, and a trailing wall, the top surface comprising a barb width measured between a barb leading edge and barb trailing edge; and
  a trailing angle, the trailing angle defined between the barb longitudinal axis and the trailing wall, the trailing wall defined between the barb trailing edge and a landing width, the landing width extending between adjacent barbs;
  wherein the barb width of each of the barbs decreases from the first end towards the second end and the trailing angle increases from the first end towards the second end, the barb width ranging from about 1.125 mm proximate the first end to about 0.95 proximate the midsection, the trailing angle increase from about 30 degrees proximate the first end to about 45 degrees proximate the midsection;
  wherein the barb width is configured to increase strength such that barbs disposed proximate the first end have greater strength than barbs disposed proximate the midsection; and
  wherein the trailing angle is configured to increase strength such that barbs disposed proximate the first end have greater strength than barbs disposed proximate the midsection.

* * * * *